Feb. 14, 1967     W. J. McANESPEY     3,304,540
VEHICLE DECELERATION CAUTION LIGHT APPARATUS
Filed Feb. 17, 1965
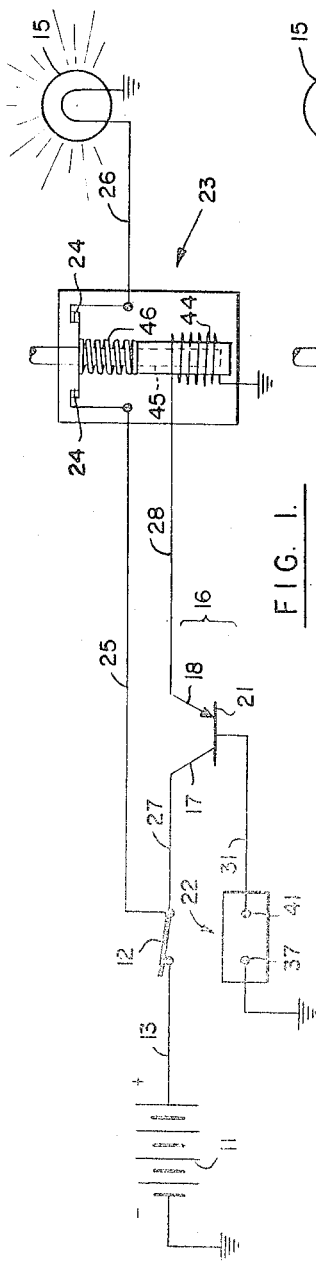
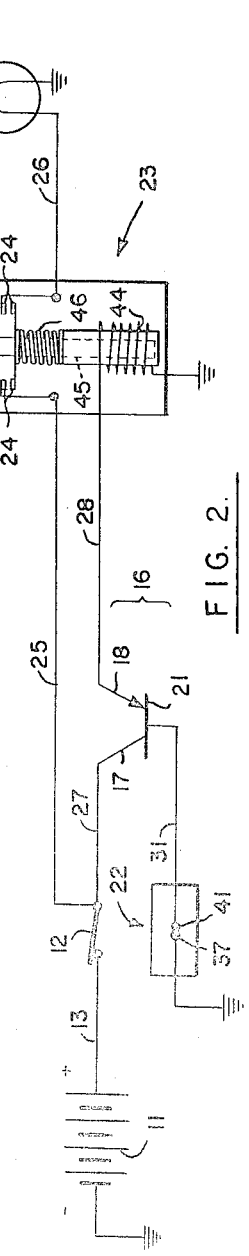
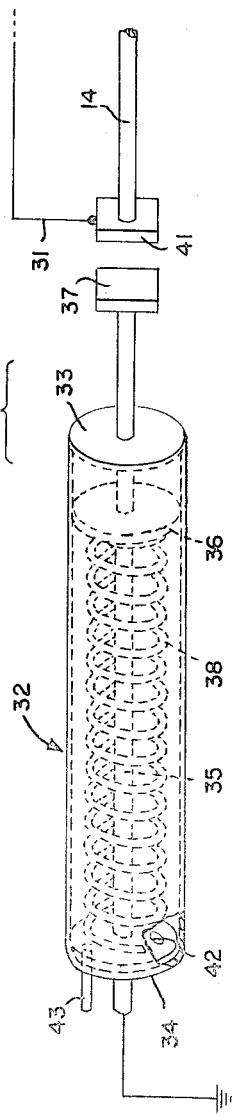
INVENTOR.
WILLIAM J. McANESPEY
BY
ATTORNEYS

United States Patent Office 3,304,540
Patented Feb. 14, 1967

3,304,540
VEHICLE DECELERATION CAUTION
LIGHT APPARATUS
William J. McAnespey, Philadelphia, Pa., assignor to
Triex, Inc., a corporation of Pennsylvania
Filed Feb. 17, 1965, Ser. No. 433,380
4 Claims. (Cl. 340—71)

This invention relates to caution light apparatus, and more particularly concerns caution light apparatus for use in a vehicle to indicate that the vehicle is decelerating.

In recent years, there has been an increasing number of rear-end automobile collisions at all ranges of speed. Frequently, an accident happens so fast that the following cars are unable to stop in time and the whole string of cars may crash into the preceding automobile.

Under the present system, the driver of the preceding vehicle signals the following driver that he is about to stop by taking his foot from the gas or accelerator pedal and hitting the brake which flashes a red stop light on the rear of his vehicle. However, there is a time lag between the time the preceding driver takes his foot from the gas pedal and places it on the brake. This time lag is in the order of three-quarters of a second, and the immediately following driver has that much less time to bring his vehicle to a stop. The third driver in line has three-quarters of a second less time than the second driver and one and one-half seconds less time than the first driver, and so on down the line.

It is an object of this invention to provide apparatus for signalling the following driver that the preceding driver is decelerating and may be about to hit his brake. It is an object of this invention to eliminate the time lag of the signal to the following driver so that he receives the warning earlier and has more time to act and slam on his brakes if that be the proper course of action.

The U.S. Department of Commerce publication Accidents on Main Rural Highways, July, 1964, notes at page 1, "the greater the variation in speed of any vehicle from the average speed of all traffic, the greater its chance of being involved in an accident."

Also, on page 2, "Thus when the preceding car lessens pressure on its accelerator while following vehicles continue under power, the greater is the chance of accident." With the caution light of this invention warning following drivers, proper and safe distances can be more effectively maintained. Speeds of leading and following vehicles can be more nearly matched.

It is another object of this invention to provide caution light apparatus which is compact, reliable, inexpensive, and fail-safe.

Other objects and advantages of this invention, including the ease with which it may be adapted to existing equipment, will further become apparent hereinafter and in the drawings, in which:

FIG. 1 is a diagrammatic view of the caution light apparatus constructed in accordance with this invention and shows the caution light in on position;

FIG. 2 is a view similar to FIG. 1 which shows the circuit with the caution light off; and FIG. 3 is an enlarged view of the actuator means of the invention.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a battery 11 and an ignition switch 12 of a motor vehicle such as an automobile. The minus side of the battery is connected to ground and the plus side is connected to ignition switch 12 by a conductor 13.

Either side of the battery may be grounded, depending upon the polarity of the electrical system in the vehicle. The ignition switch is connected to the non-grounded side of the battery.

The vehicle is also provided with accelerator pedal means for varying the speed of the vehicle, and a rod 14 moves in response to the movement of the accelerator pedal means, moving to the left in FIG. 3 when the accelerator pedal means is depressed to accelerate or maintain the speed of the vehicle, and moving to the right in FIG. 3 when the accelerator pedal means is released by the foot of the driver in order to decelerate the vehicle. Rod 14 may be connected directly to the accelerator pedal means, or may be connected thereto by intermediate linkage means.

The caution light apparatus comprises a caution light 15, a transistor 16 having a collector 17, an emitter 18 and a base 21, actuator means 22 which is adapted to be closed when the accelerator pedal means is depressed to accelerate or maintain vehicle speed, and which, when closed provides a circuit to ground through the base 21 of the transistor which when grounded permits current to flow through the emitter 18 of transistor 16 to control switch 23, and which is adapted to be opened thus opening the ground circuit and de-energizing transistor 16 when the accelerator pedal means is released to decelerate vehicle speed, and a control switch 23 having contacts 24 which are normally closed when the switch is de-energized, whereby the caution light 15 is in on condition.

The purpose of the transistor 16 is to permit the use of very low current passing through contacts 37 and 41, thus providing long life to these contacts throughout their infinite number of openings and closings, whereas use of normal current would cause arcing and burning of these contacts.

A caution light circuit extends from the plus side of battery 11 to conductor 13 to ignition switch 12, through conductor 25 to contacts 24 of control switch 23, through conductor 26 to caution light 15 and returns through ground to the negative side of battery 11.

A control switch circuit extends from the plus side of battery 11 through conductor 13 to ignition switch 12 and then through conductor 27 to collector 17 of transistor 16. It extends from emitter 18 through conductor 28 to control switch 23 and then back to the negative side of battery 11 through ground. The control switch circuit also includes actuator means 22 which is connected to base 21 by a conductor 31 through contacts 37 and 41 to ground when these contacts are closed.

Accordingly, in operation, when actuator means 22 is closed, transistor 16 is energized to energize the control switch 23 to open switch contacts 24 and extinguish caution light 15.

When actuator means 22 is opened, transistor 16 is de-energized to de-energize control switch 23 to close switch contacts 24 and turn on the caution light 15.

Actuator means 22 is shown on an enlarged sca'e in FIG. 3, and comprises a cylinder case 32 which is provided with a front end 33 and a rear end 34. A piston rod 35 and piston head 36 are positioned in case 32 with the front end of rod 35 extending through front end 33 of the case. An electrical contact 37 is mounted on the front end of piston rod 35, and a spring 38 is mounted in case 32 between rear end 34 and piston head 36 so as to urge the piston head toward the front end 33 of the case. The rear end of rod 35 is grounded by a flexible grounding wire.

The piston rod contact 37 is adapted to make with an electrical contact 41 mounted on actuator rod 14 which is actuated in response to movement of the vehicle's accelerator pedal to move toward the left in FIG. 3 and make contact with piston rod contact 37 when the accelerator pedal is being depressed, and is actuated to move to the right away from and disconnecting from piston rod contact 37 when the gas pedal is released.

A flapper valve 42 is positioned in rear end 34 of case 32, and flapper valve 42 closes to prevent air from entering case 32 when piston head 36 starts moving to the right in FIG. 3 and thus retards the movement of the piston rod contact 37 in that direction so as to cause it to disconnect from actuator rod contact 41 and open the circuit to base 21 of transistor 16.

A metering pin 43 is mounted in rear end 34 for admitting air to the interior of cylinder case 32 in controlled volume to increase or decrease the travel time for contact 37 as it follows contact 41. This provides regulation of the time that the caution light 15 burns during deceleration.

Control switch 23 is an electromagnetic switch which includes a solenoid 44, a core 45 and a spring 46. Spring 46 urges the contacts 24 to closed position when the solenoid 44 is not energized. When solenoid 44 is energized from transistor 16 through conductor 28, it moves core 45 to open contacts 24 and turn off caution light 15.

The caution light apparatus of the present invention is fail-safe in that caution light 15 remains on unless transistor 16 and control switch 23 are energized. Accordingly, any failure of transistor 16 or control switch 23 does not result in caution light 15 being off when it should be on. A failure of either transistor 16 or control switch 23 would result in caution light 15 being on instead of off, but this is a fail-safe condition, and it is better to give a false caution signal when the vehicle is actually not decelerating, than to fail to give a caution signal when the vehicle is decelerating.

The caution light apparatus of the present invention enables the leading driver in a line of vehicles to signal the following drivers that he is decelerating and may be about to hit his brakes, and eliminates the time loss between the time the driver takes his foot from the accelerator pedal and depresses the brake pedal a sufficient amount to actuate and illuminate the stop light. This gives the following driver additional time to react, and warns him that a fast stop of the preceding vehicle may be imminent. Moreover, the caution light apparatus tends to discourage tail-gating, one of the prime causes of rear end collisions. Tail-gating is a term used to define a situation wherein a following vehicle is following the preceding vehicle too closely. The flash of the caution light acts as a signal to the trailing vehicle that the leading vehicle is decelerating, whether the leading vehicle driver intends to apply his brakes or not, and thus helps the drivers maintain safe distances between cars.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. Caution light apparatus for use in a vehicle to indicate that the vehicle is decelerating, said vehicle having a battery and an ignition switch connected in electrical circuit and having accelerator pedal means for varying the speed of the vehicle, said apparatus comprising a caution light, a transistor having a collector, emitter and base, actuator means which is adapted to be closed when said accelerator pedal means is depressed to accelerate or maintain vehicle speed and which is adapted to be opened when said accelerator pedal means is released to decelerate vehicle speed, a control switch having contacts which are normally closed when the switch is de-energized whereby the caution light is in on condition, a caution light circuit having the control switch contacts connected in circuit with the caution light, and a control switch circuit including said transistor and a control switch operating means and with said actuator means in circuit with the base so that when the actuator means is closed the transistor is energized to energize the control switch operating means to open the switch contacts and extinguish the caution light, and when the actuator means is opened the transistor is de-energized to de-energize the control switch operating means to close the switch contacts and turn on the caution light, said caution light circuit and said control switch circuit being adapted to be connected in circuit with the battery and ignition switch.

2. The caution light defined in claim 1, wherein said actuator means comprises a cylinder case having a front and rear end, a piston rod and head positioned in said case with the front end of the rod extending through the front end of the case, an electrical contact mounted on the front end of the piston rod, a spring mounted in the case between the rear end of the case and the piston head to urge the piston head toward the front end of the case, said piston rod contact being adapted to make with an electrical contact mounted on an actuator rod which is actuated in response to movement of a vehicle's accelerator pedal to move toward and make contact with the piston rod contact when the pedal is being depressed, and to move away from and disconnect from the piston rod contact when the pedal is released, and a flapper valve in the rear end of case which retards the movement of the piston rod contact in the direction toward the actuator rod contact.

3. Caution light apparatus for use in a vehicle to indicate that the vehicle is decelerating, said vehicle having a battery and an ignition switch connected in series and having accelerator pedal means for varying the speed of the vehicle, said apparatus comprising a caution light, a transistor having a collector, emitter and base, actuator means which is adapted to be closed when said accelerator pedal means is depressed to accelerate or maintain vehicle speed and which is adapted to be opened when said accelerator pedal means is released to decelerate vehicle speed, an electromagnetic control switch having an armature with electrical contacts and a spring urging the contacts to closed position, said control switch having a solenoid which when energized moves the armature to open its contacts, a caution light circuit having the control switch contacts connected in circuit with the caution light, and a control switch circuit including said transistor and control switch solenoid, with said actuator means in circuit with the base so that when the actuator means is closed the transistor is energized to energize the control switch solenoid to open the control switch contacts and extinguish the caution light, and when the actuator means is opened the transistor is de-energized to de-energize the control switch solenoid to close the control switch contacts and turn on the caution light.

4. Caution light apparatus for indicating that a vehicle is decelerating, comprising a battery, an ignition switch, a control switch having contacts which are normally closed when the switch is de-energized, a caution light, a transistor having a collector, emitter and base, actuator means connected to the base for opening and closing a circuit to the base, a caution light circuit including the battery, ignition switch, control switch contacts and caution light connected in series, and a control switch circuit including the battery, ignition switch, collector, emitter and control switch operating means connected in series, and said actuator means in circuit with the base so that when the actuator means is closed the transistor is energized to energize the control switch operating means to open the switch contacts and extinguish the caution light, and when the actuator means is opened the transistor is de-energized to de-energize the control switch operating means to close the switch contacts and turn on the caution light.

No references cited.

NEIL C. READ, *Primary Examiner.*

A. H. WARING, *Assistant Examiner.*